(12) United States Patent
Gordon et al.

(10) Patent No.: US 9,858,699 B2
(45) Date of Patent: Jan. 2, 2018

(54) IMAGE ANONYMIZATION USING ANALYTICS TOOL

(71) Applicant: International Business Machines Corporation, Armonk, NY (US)

(72) Inventors: Itai Gordon, Jerusalem (IL); Peter Hagelund, Copenhagen (DK); David J. Henderson, Newtown, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/417,971

(22) Filed: Jan. 27, 2017

(65) Prior Publication Data

US 2017/0140567 A1    May 18, 2017

Related U.S. Application Data

(63) Continuation of application No. 14/858,605, filed on Sep. 18, 2015.

(51) Int. Cl.
| | | |
|---|---|---|
| *G06T 11/60* | (2006.01) | |
| *G06K 9/46* | (2006.01) | |
| *G06F 17/30* | (2006.01) | |

(52) U.S. Cl.
CPC ........ *G06T 11/60* (2013.01); *G06F 17/30256* (2013.01); *G06K 9/46* (2013.01)

(58) Field of Classification Search
CPC ..... G06T 11/60; G06K 9/46; G06F 17/30256; G06F 17/30259; G06F 21/6245; G06F 21/6254; H04W 12/02
USPC .......................................... 382/190, 195, 215
See application file for complete search history.

(56) References Cited

U.S. PATENT DOCUMENTS

| | | | | |
|---|---|---|---|---|
| 7,668,345 | B2 * | 2/2010 | Kiyohara | ........... G06K 9/00281 |
| | | | | 382/115 |
| 7,860,342 | B2 * | 12/2010 | Levien | ................... G06F 21/10 |
| | | | | 358/1.14 |
| 8,126,190 | B2 * | 2/2012 | Jung | ................... G06K 9/3241 |
| | | | | 382/100 |
| 8,270,718 | B2 | 9/2012 | Drory et al. | |
| 8,275,803 | B2 | 9/2012 | Brown et al. | |

(Continued)

FOREIGN PATENT DOCUMENTS

WO    WO 2013/136093 A3    9/2013

OTHER PUBLICATIONS

"List of IBM Patents or Patent Applications Treated as Related", Jan. 27, 2017, 2 pages.

(Continued)

*Primary Examiner* — Daniel Mariam
(74) *Attorney, Agent, or Firm* — Stephen R. Tkacs; Stephen J. Walder, Jr.; Reza Sarbakhsh

(57) ABSTRACT

A mechanism is provided in a data processing system for image anonymization. The mechanism identifies a plurality of items in an image and extracts properties of the plurality of items into one or more data structures. The mechanism queries an analytics tool about whether a combination of properties of the plurality of items identifies a person in the image. Responsive to determining a given combination of properties of the plurality of items identifies a person in the image, the mechanism modifies the plurality of items in the image to form an anonymized image and outputs the anonymized image.

10 Claims, 3 Drawing Sheets

(56) References Cited

U.S. PATENT DOCUMENTS

| | | | |
|---|---|---|---|
| 8,744,119 B2* | 6/2014 | Shuster | H04L 63/0407 |
| | | | 382/100 |
| 9,298,969 B2* | 3/2016 | Sako | G06F 21/6245 |
| 9,426,387 B2* | 8/2016 | Jung | G06K 9/3241 |
| 2008/0180539 A1 | 7/2008 | Jung et al. | |
| 2009/0179919 A1* | 7/2009 | Lidestri | G06Q 30/0603 |
| | | | 345/647 |
| 2009/0287678 A1 | 11/2009 | Brown et al. | |
| 2011/0066587 A1 | 3/2011 | Ferrucci et al. | |
| 2011/0110568 A1 | 5/2011 | Vesper et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2015/0110418 A1 | 4/2015 | Bayram et al. | |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Newton, Elaine et al., "Preserving Privacy by De-Identifying Facial Images", Carnegie Mellon University, School of Computer Science, Technical Report, CMU-CS-03-119, Pittsburgh, PA, Mar. 2003, 26 pages.

Yuan, Michael J., "Watson and healthcare, How natural language processing and semantic search could revolutionize clinical decision support", IBM, developerWorks, IBM Corporation, Apr. 12, 2011, 14 pages.

\* cited by examiner

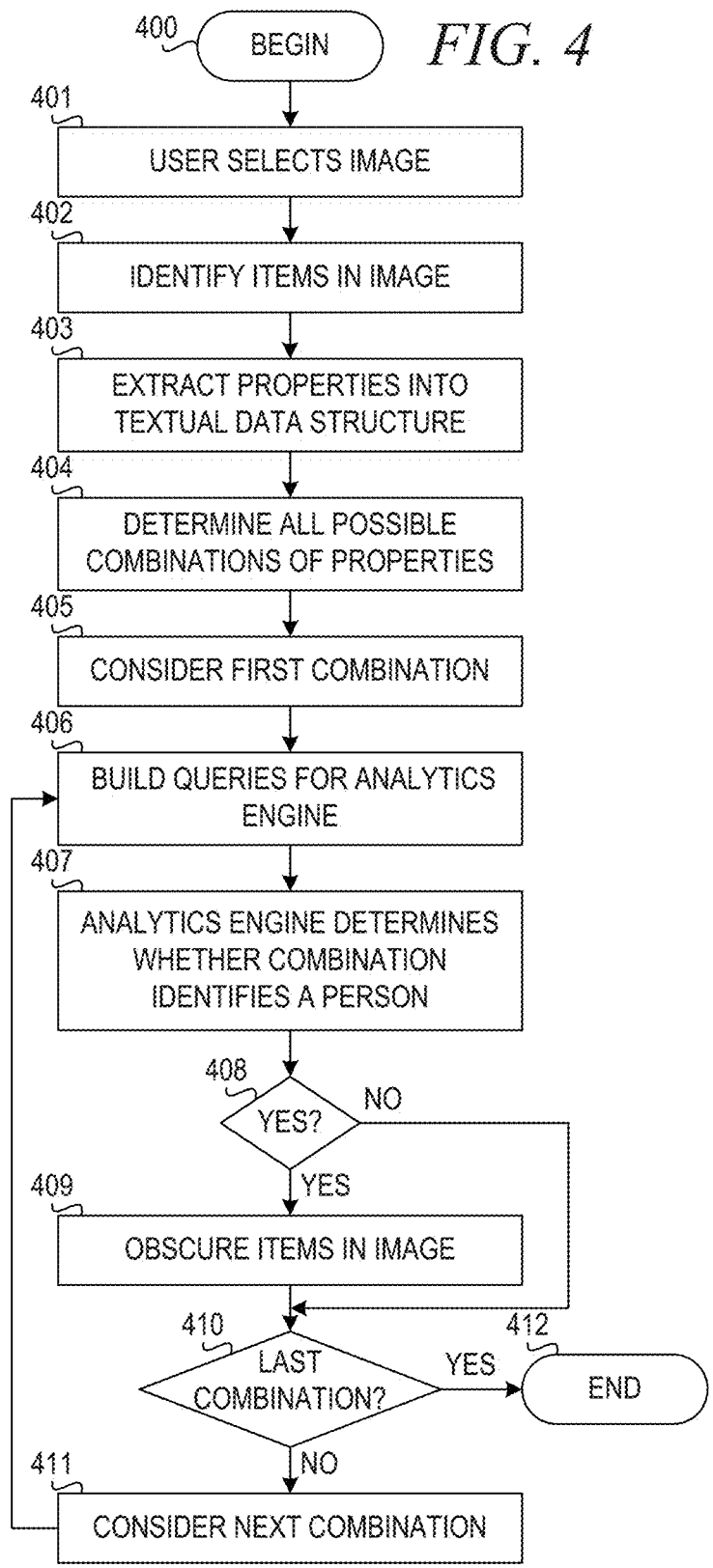

IMAGE ANONYMIZATION USING ANALYTICS TOOL

BACKGROUND

The present application relates generally to an improved data processing apparatus and method and more specifically to mechanisms for image anonymization using an analytics tool Data anonymization is a type of information sanitization whose intent is privacy protection. It is the process of either encrypting or removing personally identifiable information from data sets, so that the people whom the data describe remain anonymous. Data anonymization enables the transfer of information across a boundary, such as, for example, between two departments within an agency or between two agencies, while reducing the risk of unintended disclosure, and in certain environments in a manner that enables evaluation and analytics post-anonymization. In the context of medical data, anonymized data refers to data from which the patient cannot be identified by the recipient of the information. The name, address, and full post code must be removed together with any other information which, in conjunction with other data held by or disclosed to the recipient, could identify the patient. Generalization and perturbation are two popular anonymization approaches for relational data.

Increasingly, users of Information Technology (IT) systems are required to handle sensitive information, such as Personal Identifiable Information (PII), other Sensitive Personal Information (SPI), and information in images that is otherwise of a secret, sensitive, or proprietary nature. At times, images containing such information must be saved or presented to third parties with the sensitive information anonymized because of laws, regulatory compliance requirements, or company policy. For example, an insurance company may send an image of an automobile accident to an outsourcing investigator in order to determine which car caused the accident. According to company policy, no identifiable element should be found in the image. Such an image may include a few people with exposed faces, a few cars with exposed license numbers and identifiable models, and a few houses in the background. Even if faces are changed or obscured, there may be elements in the image that can be combined to identify individuals in the image.

SUMMARY

In one illustrative embodiment, a method, in a data processing system, is provided for image anonymization. The method comprises identifying a plurality of items in an image and extracting properties of the plurality of items into one or more data structures. The method further comprises querying an analytics tool about whether a combination of properties of the plurality of items identifies a person in the image. The method further comprises modifying the plurality of items in the image to form an anonymized image responsive to determining a given combination of properties of the plurality of items identifies a person in the image, and outputting the anonymized image.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a system for image anonymization using analytics in accordance with an illustrative embodiment.

DETAILED DESCRIPTION

Figure 1:
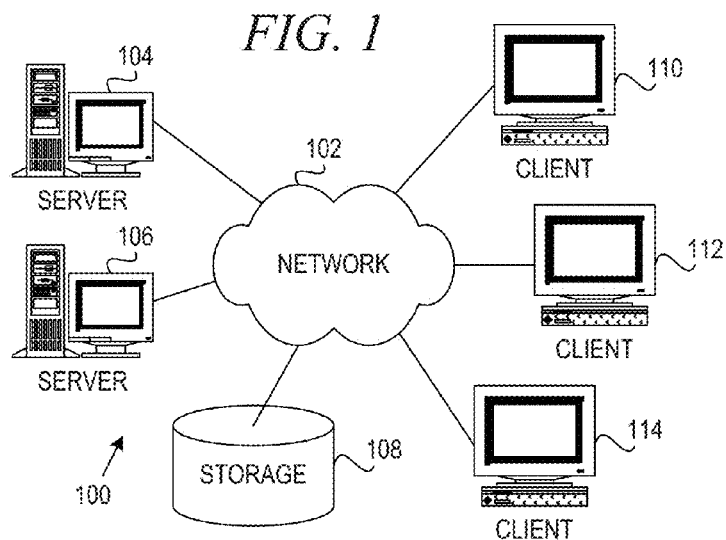
FIG. 1 is an example diagram of a distributed data processing system in which aspects of the illustrative embodiments may be implemented.

The illustrative embodiments provide mechanisms for anonymizing an image by identifying parts of the image that, in combination, can possibly identify an individual in the image using analytics. A user of the system selects an image to anonymize, the image containing a plurality of items or items that could identify an individual. These items may include people, vehicles, buildings, and the like. The mechanism uses image processing techniques to identify properties of the items. For example, for a person, the mechanism may determine height, hair color, eye color, clothing style, or the like. For a vehicle, the mechanism may determine make, model, vehicle style, condition, color, state of license, and so forth. For a building, the mechanism may determine a residence, a business, a parking structure, a restaurant, or the like. Then, for each combination of item properties, the mechanism determines a probability that the given combination can identify one or more individuals in the image. The mechanism then anonymizes the image by replacing or obscuring the items or changing particular properties of the items in the image. The mechanism then outputs the anonymized image to the user.

Before continuing discussion of various aspects of the illustrative embodiments, it should first be appreciated that throughout this description the term "mechanism" is used to refer to elements of embodiments of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
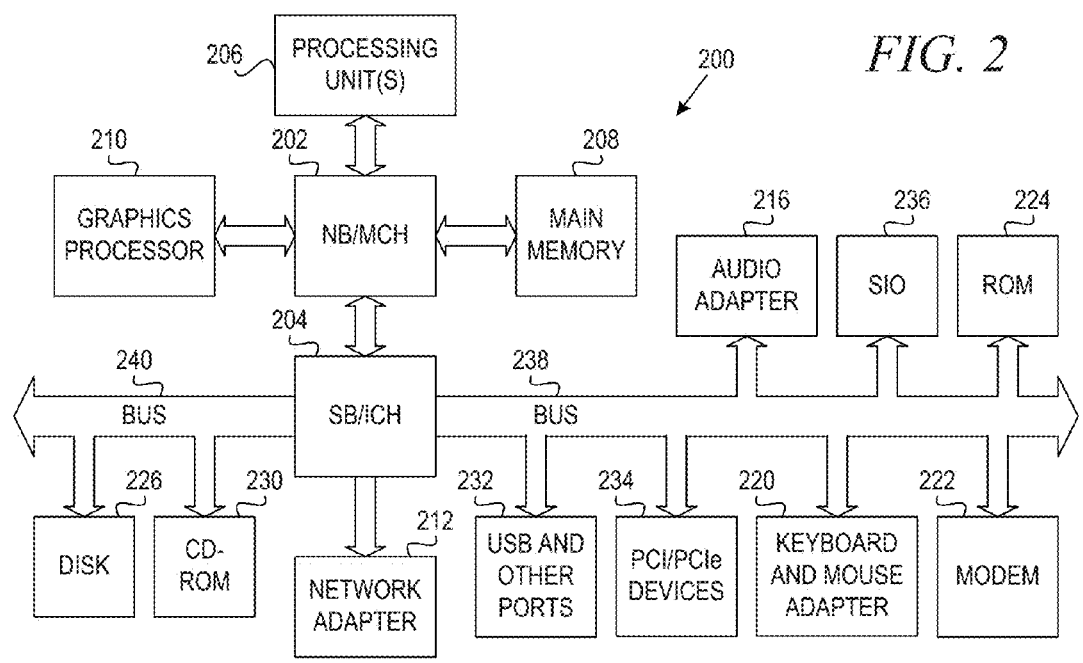
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 includes the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for image anonymization using analytics. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates image anonymization using analytics.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may include one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to image anonymization using analytics.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
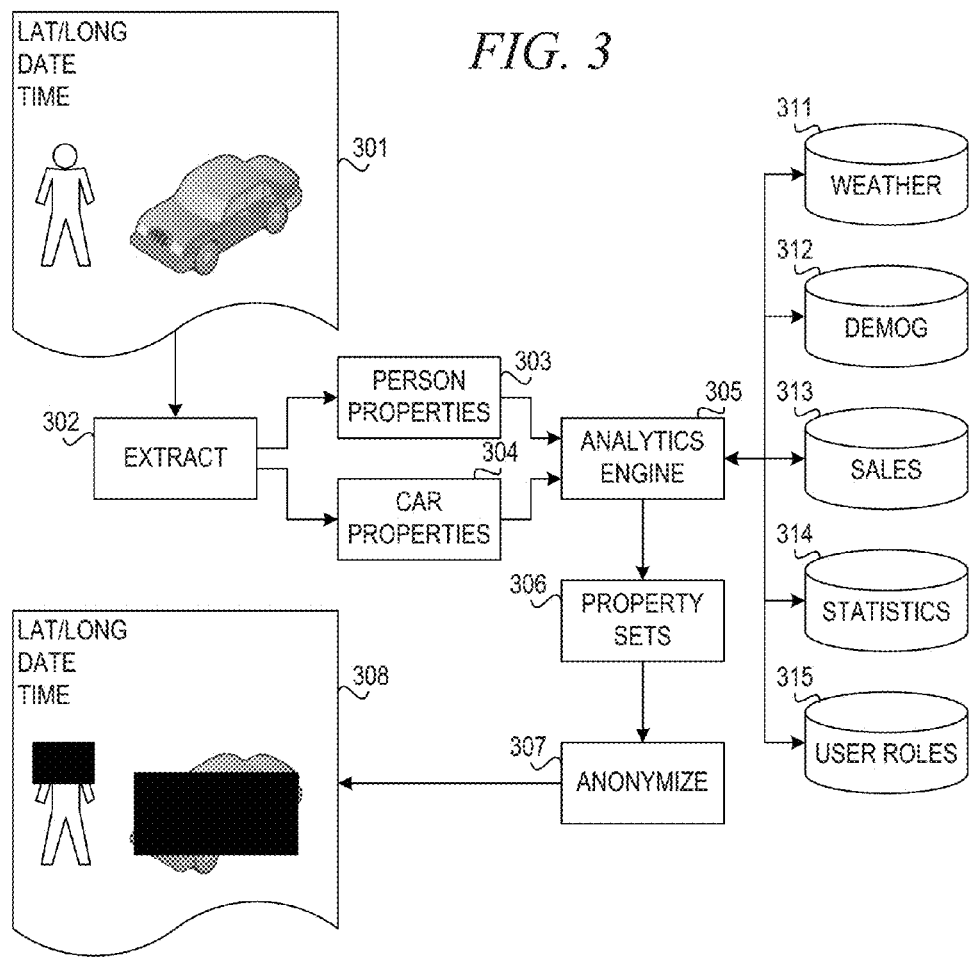
FIG. 3 is a block diagram illustrating a system for image anonymization using analytics in accordance with an illustrative embodiment.

FIG. 3 is a block diagram illustrating a system for image anonymization using analytics in accordance with an illustrative embodiment. An extract component 302 receives a selected image 301, which includes a plurality of items, such as a person and a car, for example. Extract component 302 performs image processing to identify the items and extract properties to form person properties 303 and car properties 304. The image processing techniques may include image sharpening, image smoothing, edge detection, pattern recognition, and other known image processing techniques. Person properties 303 may include approximate height, body type, hair color, hair style, eye color, clothing items, etc. Car properties 304 may include make, model, type, color, etc. Other types of items may include other properties. For example, building properties may include type, color, signage, etc.

Analytics tool 305 receives person properties 303 and car properties 304. Analytics is the discovery and communication of meaningful patterns in data. Especially valuable in areas rich with recorded information, analytics relies on the simultaneous application of statistics, computer programming, and operations research to quantify performance. Analytics often favors data visualization to communicate insight. Specifically, areas within analytics include predictive analytics, enterprise decision management, retail analytics, store assortment and stock-keeping unit optimization, marketing optimization and marketing mix modeling, web analytics, sales force sizing and optimization, price and promotion modeling, predictive science, credit risk analysis, and fraud analytics. Since analytics can require extensive computation (see big data), the algorithms and software used for analytics harness the most current methods in computer science, statistics, and mathematics.

Analytics tool 305 is a software application, computer system, or service that performs analytics on data based on queries from the image anonymization system. In one embodiment, analytics tool 305 may be a software application executing on the same computing device as the image anonymization system. In an alternative embodiment, analytics tool 305 may execute on a different computing device, such as a server, connected to the image anonymization system via a local area network, a wide area network such as the Internet, or other communication means. In another embodiment, analytics tool 305 is a service executing on the same or a different computing device that performs analytics on data based on queries. For example, analytics tool 305 may be a service executing in the cloud.

Examples, of an analytics tool is the IBM Watson™ Analytics system available from International Business Machines (IBM) Corporation of Armonk, N.Y. IBM Watson™ Analytics offers the benefits of advanced analytics without the complexity. A smart data discovery service available on the cloud guides data exploration, automates predictive analytics, and enables effortless dashboard and infographic creation.

Some items, such as a person's face or a vehicle's license plate, are in themselves identifying and prior art solutions recognize these items and mask, obscure, or obfuscate them. Other items, such as type and color of a vehicle, type and color of clothing, type and size of dwelling, items stored on a piece of property, and non-identifying signage may be combined in context to be identifying. The system of the illustrative embodiment identifies these combinations of items and masks, obscures, or obfuscates them.

The context includes at least the image metadata, which may include location, time of day, season, weather, the roles or rights of the viewer, and the combination of image elements that may or may not contribute to identification of one or more people. The context may also include any number of data sources containing demographic and other information about the locality as well as the potentially identifying image elements.

By way of example, map services and satellite imaging may provide an image of a person getting out of a car in front of a house. In one illustrative embodiment, the present system identifies and analyzes elements of the image other than, and in addition to, the car's license plate and the person's face. In another illustrative embodiment, the present system identifies and analyzes elements of the image other than the car's license plate and the person's face, wherein a different system may identify and blur the car's license plate and the person's face. These other elements may include the type and color of the car, items carried in, on, or towed by the car, the person's clothing, the dwelling and any items stored or displayed on the property. The system identifies the location and time of day the image was captured. Using analytics tool 305, the system queries a number of relevant data sources for statistical information, including but not limited to:

sales figures by region for the vehicle make and model;
popularity of the vehicle color;
popularity of clothing style and color, and,
demographic information for the location, including income, dwelling types, group membership, etc.

In the depicted example, the data sources may include, for example, weather data 311, demographic information 312, sales information 313, statistics 314, and user roles 315. Various combinations of data sources, including more or fewer data sources may be used within the scope and spirit of the illustrative embodiment. The goal of the queries is to ascertain whether each given combination of image elements (properties) constitute an "average," middle-of-the-bell-cure situation or an outlier.

In the case of an outlier, one may conclude that the combination of properties is a property set that could potentially identify an individual. The system of the illustrative embodiment outputs the identified property sets 306. Anonymize component 307 receives the identified property sets 306 and replaces, blurs, obscures, or obfuscates the image elements in property sets 306 to form anonymized image 308.

Examples of identifying property sets 306 may include:
make and model of a vehicle that is atypical for the locality (e.g., an expensive sports car in a rural area or a large sports utility vehicle in a European city);
clothing style and color (e.g., trendy, bright colored clothing in a typically conservative area);
signs of group membership (e.g., printed t-shirt or hat) that is atypical for the area;
dress that is inconsistent with the season and weather (e.g., light clothing in cold weather might indicate cold-climate upbringing); or
physical attributes atypical for the area.

In one embodiment, an administrator configures a model of elements to be replaced. The administrator may define relationships between elements, e.g., that car number plates are part of a car. For each element, the administrator assigns an algorithm or service that can identify that element in an image and extract its properties into a well-defined data structure, which contains, for example, the area of each element, color, model, real dimensions, etc. The administrator configures analytics tool 305 to decide based on textual description of the elements in the image what is the probability of identifying a person based on the elements. The administrator defines which combinations of elements should be checked in order to decide if they could identify the person who uses, owns, or otherwise relates to them in a way that could lead to identification of the person.

A user, such as a third party with a specified user role, selects an image for presentation, storage, or transmission. The system of the illustrative embodiments attempts to identify every item in the image and extract the properties of the items into one or more textual data structures using defined algorithms or services. The system queries all possible combinations, or alternatively predefined combinations, of properties of elements that were extracted from image to build queries. The analytics tool returns for each set of properties whether the set could potentially identify a person. For example, the analytics tool may return a probability that the property set identifies a person, which can then be compared to a threshold. If a given set of properties could identify a person, then the system replaces the items with other items or obscures the items.

In one particular example, an image may contain a man with a green polo shirt getting out of a small red sports car near the Eiffel tower. None of the elements alone would identify that person; however, the combination of those elements might identify the man. For instance, the green polo shirt may be have a distinctive style that is easily identifiable as being made by a particular designer and may be sold in only a few cities, and the sports car may be manufactured and sold primarily in one country. In this case, the query for the analytics tool may be, "what are the chances of identifying a man wearing a green polo shirt owning or using a small red sports car near the Eiffel tower?" If the result from the analytics tool is that there is a high chance of identifying the man, then the system replaces those items in the image (or some of them); however, if the result is that there is a low chance of identifying the man, then the system does not replace the items.

In one embodiment, the system starts with single property sets and proceeds with gradually larger sets. If a set is found to be identifying, then all subsequent sets that contain this set could be ignored. The system may replace only the items in an identifiable set that got the highest rank for identifying when tested as a standalone set. After reaching some limit of sets or traversing all of the preconfigured combination size, the system returns the anonymized image.

In an example embodiment, the system anonymizes images in the context of the user's rights and roles. For example, a publicly available satellite imaging system serving up images to unknown users may require a very high degree of protection of the people in the images, whereas an insurance company's or local law enforcement agency's internal, private system serving up images (e.g., auto accident images) may take into account the rights and roles of the particular user as defined by local/relevant legislation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 4 is a flowchart illustrating operation of a system for image anonymization using analytics in accordance with an illustrative embodiment. Operation begins (block 400), and user selects an image for presentation, storage, or transmission (block 401). The system uses image processing techniques to identify items in the image (block 402) and to extract properties of the items into one or more textual data structures (block 403).

The system then determines all possible combinations of item properties (block 404). The system may start with single property sets and proceed with gradually larger sets. If a given set is found to be identifying, then all sets that contain the given set may be ignored. The system considers a first combination of item properties (block 405) and builds queries for an analytics tool (block 406). The analytics tool determines whether the combination identifies a person based on analytics performed using a plurality of data sources (block 407). The system determines whether the combination of properties is identifying (block 408). If the combination of properties is identifying, then the system obscures the corresponding items in the image (block 409).

Thereafter, or if the combination of properties is not identifying in block 408, the system determines whether the combination of item properties the last combination (block 410). If the system determines that the combination of item properties is not the last combination, then the system considers the next combination (block 411), and operation returns to block 406 to build queries for the analytics tool. If the system determines that the combination of item properties is the last combination in block 410, then operation ends (block 412).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for image anonymization using analytics. The mechanisms leverage weather data, demographic data, sales statistics, other statistics, and user rights and roles, for example, to determine whether combinations of item properties are likely to identify a person in an image. The mechanism then replace, obscure, or obfuscate items in the image corresponding to combinations of item properties that identify one or more people in the image, thus anonymizing the image.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for image anonymization, the method comprising:
   identifying a plurality of items in an image;
   performing image analysis to identify properties of the plurality of items;
   storing the properties of the plurality of items into one or more data structures;
   querying an analytics tool to determine, for each combination of two or more properties of the plurality of items, a probability that the combination of two or more properties of the plurality of items identifies a person in the image;
   determining that a given combination of two or more properties of the plurality of items identifies a person in the image by comparing its corresponding probability to a threshold;
   responsive to determining the given combination of two or more properties of the plurality of items identifies a person in the image, modifying the plurality of items in the image to form an anonymized image; and
   outputting the anonymized image.

2. The method of claim 1, wherein identifying the plurality of items comprises performing image processing on the image.

3. The method of claim 1, wherein a given item within the plurality of items comprises a person and wherein properties of the given item comprise at least one of hair color, eye color, body type, height, clothing items, clothing color, or clothing style.

4. The method of claim 1, wherein a given item within the plurality of items comprises a vehicle and wherein properties of the given item comprise at least one of make, model, color, vehicle type, or state of license plate.

5. The method of claim 1, wherein a given item within the plurality of items comprises a dwelling and wherein properties of the given item comprise at least one of dwelling type or signage.

6. The method of claim 1, wherein querying the analytics tool comprises identifying a plurality of combinations of properties and generating a query for the analytics tool for each of the plurality of combinations of properties.

7. The method of claim 6, wherein identifying the plurality of combinations of properties comprises starting with single property sets and proceeding with gradually larger property sets.

8. The method of claim 1, wherein the analytics tool whether a given combination of properties of the plurality of items identifies a given person in the image based on a plurality of data sources.

9. The method of claim 8, wherein the plurality of data sources comprise at least one of weather data, demographic data, sales statistics, or user rights and roles.

10. The method of claim 1, wherein modifying the plurality of items in the image comprises replacing, obscuring, or obfuscating one or more items corresponding to the given combination of two or more properties.

* * * * *